United States Patent
Tsai

(10) Patent No.: US 9,421,652 B2
(45) Date of Patent: Aug. 23, 2016

(54) CENTER FRAME OF CNC MACHINE TOOL

(71) Applicant: ALEX-TECH MACHINERY INDUSTRIAL CO., LTD., Taichung (TW)

(72) Inventor: Peter T. H. Tsai, Taipei (TW)

(73) Assignee: Alex-Tech Machinery Industrial Co., Ltd., Taichung (TW)

( * ) Notice: Subject to any disclaimer, the term of this patent is extended or adjusted under 35 U.S.C. 154(b) by 271 days.

(21) Appl. No.: 14/272,564

(22) Filed: May 8, 2014

(65) Prior Publication Data

US 2015/0122092 A1    May 7, 2015

(30) Foreign Application Priority Data

Nov. 1, 2013    (TW) .............................. 102220418 U

(51) Int. Cl.
*B23B 23/00* (2006.01)
*B23Q 1/76* (2006.01)
*B23Q 1/00* (2006.01)

(52) U.S. Cl.
CPC ... *B23Q 1/76* (2013.01); *Y10T 82/27* (2015.01)

(58) Field of Classification Search
CPC ............ B23Q 1/40; B23Q 1/76; B23Q 1/763; B23Q 1/766; B23B 23/005; B23B 2233/10
See application file for complete search history.

(56) References Cited

U.S. PATENT DOCUMENTS

| | | | | |
|---|---|---|---|---|
| 2,146,244 A * | 2/1939 | Babcock | ............. | B23Q 1/0063 82/164 |
| 2,239,413 A * | 4/1941 | Dewey | ................. | B23Q 35/102 142/38 |
| 2,390,888 A * | 12/1945 | Liber | ....................... | B23Q 1/76 82/148 |
| 2,776,842 A * | 1/1957 | Marsden | ............. | B23B 31/1269 279/146 |
| 2,956,463 A * | 10/1960 | Gibson | .................... | B23Q 1/76 82/164 |
| 3,314,503 A * | 4/1967 | Neubert | .................. | F16F 15/10 174/42 |
| 4,044,861 A * | 8/1977 | Abu-Akeel | ........... | F16F 15/027 188/322.5 |
| 4,388,027 A * | 6/1983 | Blaimschein | ............ | B23Q 1/76 409/131 |
| 4,546,681 A * | 10/1985 | Owsen | ..................... | B23Q 1/76 294/116 |
| 5,481,951 A * | 1/1996 | Kiefer | ...................... | B23Q 1/76 82/162 |
| 6,505,533 B2 * | 1/2003 | Kroisandt | ............ | B23Q 1/0036 82/157 |
| 8,813,616 B2 * | 8/2014 | Hangleiter | ............... | B23Q 1/76 82/157 |
| 2014/0109734 A1 * | 4/2014 | Perez | ....................... | B23Q 1/76 82/152 |

FOREIGN PATENT DOCUMENTS

| | | | | |
|---|---|---|---|---|
| FR | 1.165.866 | * | 10/1958 | ............... B23B 5/00 |
| GB | 158280 | * | 2/1921 | ............... B23B 5/00 |
| SU | 1004066 A2 | * | 3/1983 | ............... B23Q 1/76 |

* cited by examiner

*Primary Examiner* — Will Fridie, Jr.
(74) *Attorney, Agent, or Firm* — Trop Pruner & Hu, P.C.

(57) ABSTRACT

A center frame for supporting a workpiece includes a lower seat, and an upper seat pivotable relative to the lower seat between a clamping position, where the upper seat cooperates with the lower seat to define a clamping opening for receiving and clamping the workpiece, and a releasing position, where the upper seat is rotated away from the lower seat. A clamping unit includes first, second and third abutment support units, each of which has an abutment portion located in the clamping opening, and an operating portion opposite to the abutment portion. The operating portion of each of the first to third abutment support units is operated to move the abutment portion to abut against or away from the workpiece.

7 Claims, 6 Drawing Sheets

CENTER FRAME OF CNC MACHINE TOOL

CROSS REFERENCE TO RELATED APPLICATION

This application claims priority of Taiwanese Patent Application No. 102220418, filed on Nov. 1, 2013.

BACKGROUND OF THE INVENTION

1. Field of the Invention

This invention relates to a CNC machine tool, more particularly to a center frame of a CNC machine tool.

2. Description of the Related Art

FIG. 1 illustrates a center frame 10 of a CNC machine tool 1 as disclosed in Taiwanese Patent No. M462163. To conduct machining of a long workpiece 8 on the machine tool 1, the center frame 10 is used for clamping the workpiece 8 in order to prevent flexing of the workpiece 8 due to excessive length thereof, so that an accurate machining of the workpiece 8 can be performed. The center frame 10 mainly includes a base 11 mounted on the machine tool 1, a pair of clamps 12 respectively pivoted to upper and lower portions of the base 11, a pair of drive units 13 mounted on the base 11 and respectively driving rotations of the clamps 12 relative to the base 11, and a central abutment support unit 14 mounted on the base 11 between the clamps 12. The clamps 12 are driven by the drive units 13 to abut against or to move away from the workpiece 8. The central abutment support unit 14 includes an operating portion 141 connected to the base 11, and an abutment portion 142 for abutting against the workpiece 8. The operating portion 141 is operated to move the abutment portion 142 to abut against or away from the workpiece 8. The center frame 10 utilizes coordination between the base 11 and the clamps 12, the drive units 13 and the central abutment support unit 14 for stably supporting the workpiece 8.

Because the drive units 13 and the clamps 12 are linked through a screwed structure, when the drive units 13 are operated to drive the clamps 12 to abut against or away from the workpiece 8, the movements of the clamps 12 are slow, so that clamping or removal time of the workpiece 8 is lengthened. Furthermore, because the angle of rotation of the clamps 12 toward or away from each other is limited, the workpiece 8 can only be moved in or out of the center frame 10 through an opening between the clamps 12.

SUMMARY OF THE INVENTION

Therefore, the object of the present invention is to provide a center frame of a CNC machine tool that is capable of overcoming the aforesaid drawbacks of the prior art.

According to this invention, a center frame of a CNC machine tool for supporting a workpiece, which defines a longitudinal axis, comprises a lower seat, an upper seat and a clamping unit. The upper seat is pivoted to a top end of the lower seat and is pivotable about an axis which is parallel to the longitudinal axis. The upper seat is pivotable relative to the lower seat between a clamping position and a releasing position. In the clamping position, the upper seat cooperates with the lower seat to define a clamping opening for receiving and clamping the workpiece. In the releasing position, the upper seat is rotated away from the lower seat. The clamping unit includes a first abutment support unit disposed on a bottom portion of the lower seat, a second abutment support unit disposed on the lower seat in proximity to the top end thereof, and a third abutment support unit disposed on one end of the upper seat distal from the top end of the lower seat. Each of the first, second and third abutment support units has an abutment portion located in the clamping opening, and an operating portion opposite to the abutment portion. The operating portion of each of the first, second and third abutment support units is operated to move the abutment portion to abut against or away from the workpiece, so that the workpiece is clamped among the first, second and third abutment support units when the abutment portions of the first, second and third abutment support units abut against the workpiece.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
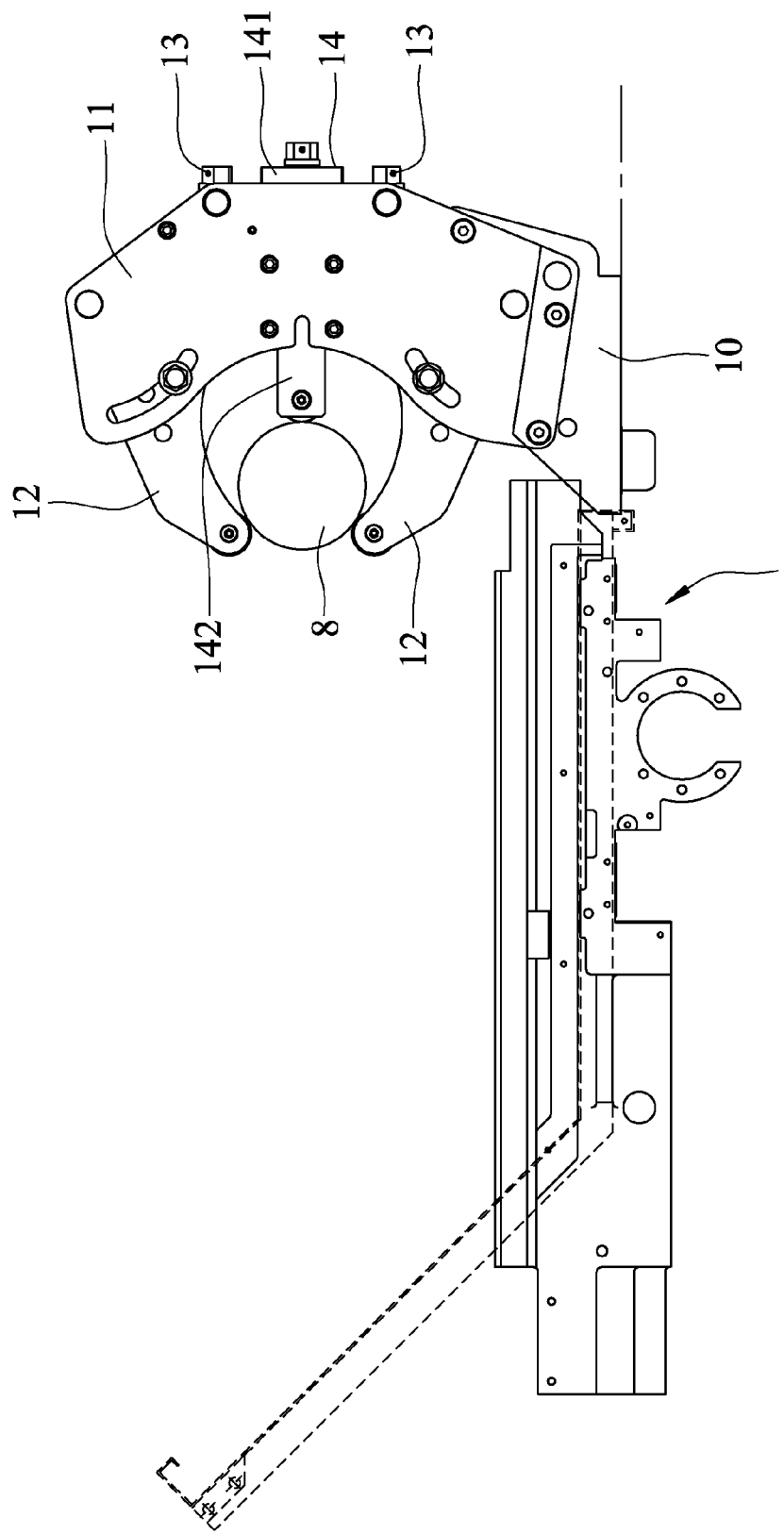
FIG. 1 is a schematic view of a center frame of a CNC machine tool disclosed in Taiwanese Patent No. M462163.

Referring to FIGS. 2 to 6, a center frame 100 of a CNC machine tool 9 according to the preferred embodiment of the present invention for supporting a workpiece 80 comprises a lower seat 2, an upper seat 3, a limiting unit 4, and a clamping unit. The CNC machine tool 9 includes a machine bed 91. The workpiece 80 defines a longitudinal axis (L).

Figure 2:
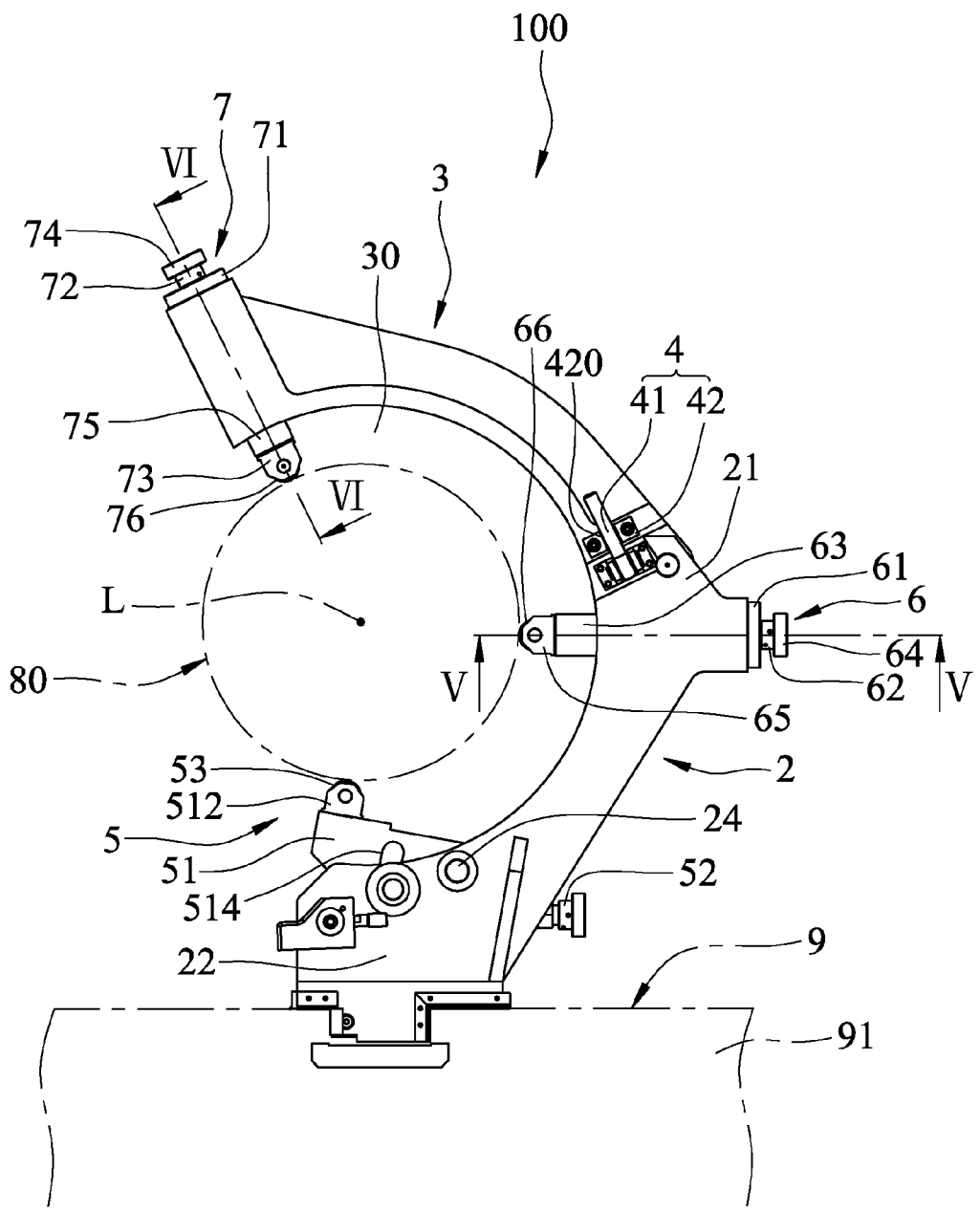
FIG. 2 is a schematic view of a center frame of a CNC machine tool according to the preferred embodiment of the present invention.
Figure 3:
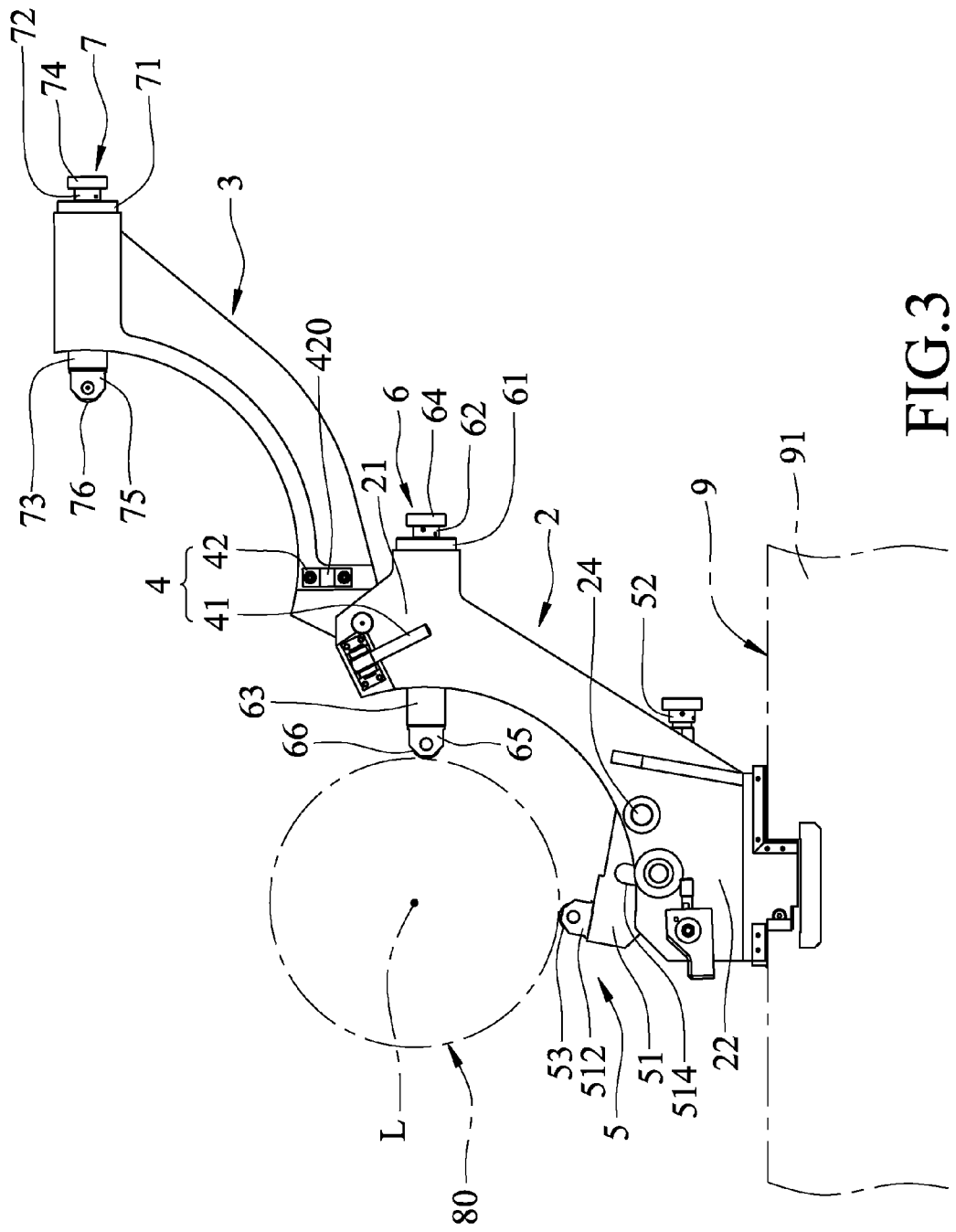
FIG. 3 is a view similar to FIG. 2, but illustrating an upper seat being rotated relative to a lower seat to a releasing position.
Figure 4:
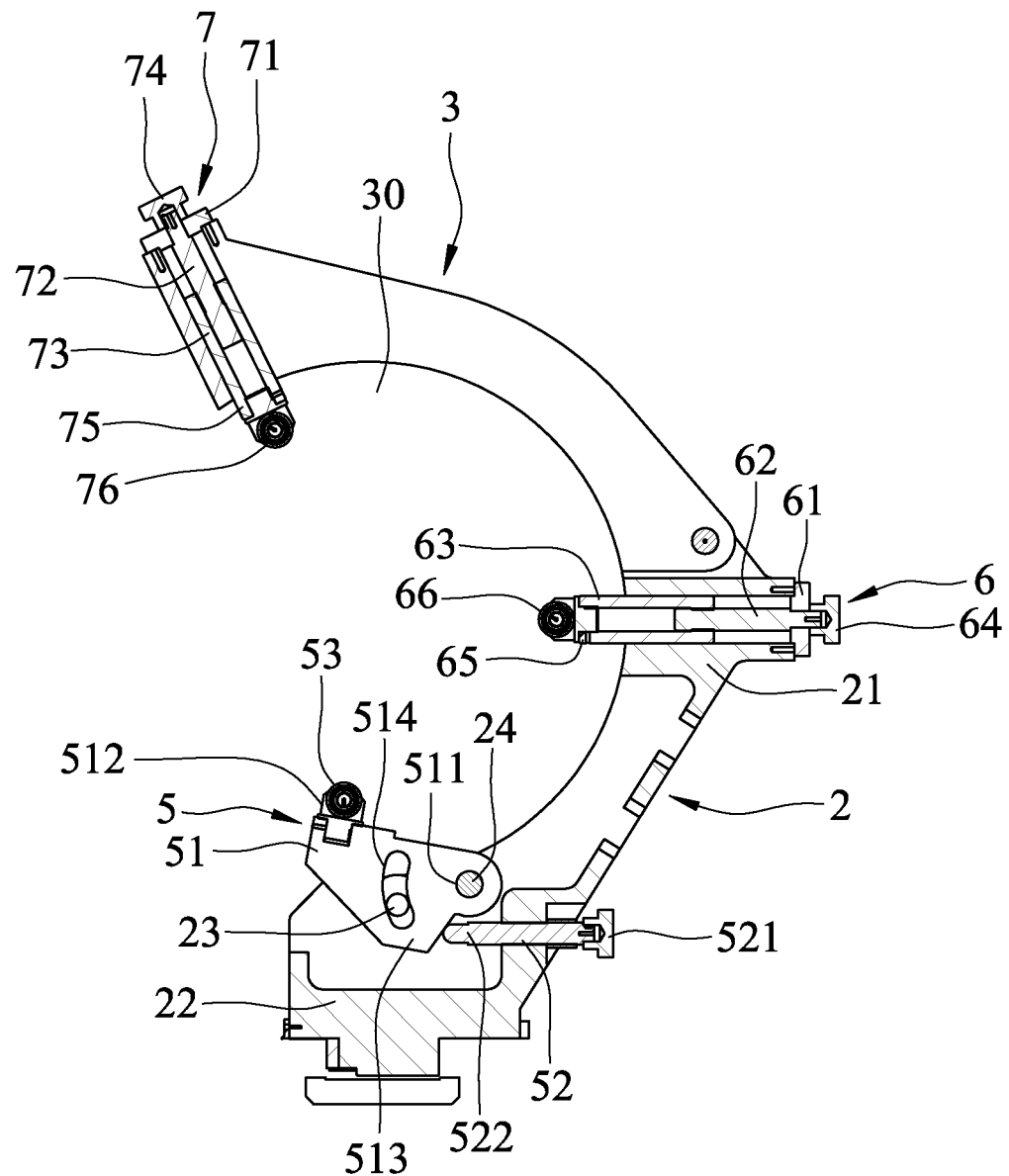
FIG. 4 is a sectional view of the preferred embodiment.

The lower seat 2 is fixed on the machine bed 91. The upper seat 3 is pivoted to a top end 21 of the lower seat 2, and is pivotable about an axis that is parallel to the longitudinal axis (L). The upper seat 3 is pivotable relative to the lower seat 2 between a clamping position, as shown in FIG. 2, and a releasing position, as shown in FIG. 3. In the clamping position, the upper seat 3 cooperates with the lower seat 2 to define a clamping opening 30 for receiving and clamping the workpiece 80. In the releasing position, the upper seat 3 is rotated away from the lower seat 2.

The limiting unit 4 includes a limiting rod 41, and a limiting grooved element 42 having a limiting groove 420. The limiting rod 41 has one end pivoted to the lower seat 2 at a location proximate to a junction of the upper seat 3 and the lower seat 2, and the other end free. The limiting grooved element 42 is fixed to the upper seat 3 at a location proximate to the junction of the upper seat 3 and the lower seat 2. When the upper seat 3 is in the clamping position, the limiting grooved element 42 corresponds in position with the limiting rod 41. At this time, the free end of the limiting rod 41 can be turned upward to engage with the limiting groove 420, thereby limiting the upper seat 3 at the clamping position.

The clamping unit includes a first abutment support unit 5, a second abutment support unit 6 and a third abutment support unit 7. The first abutment support unit 5 is disposed on a bottom portion 22 of the lower seat 2, and includes a first positioning seat 51, a drive member 52 and a roller 53. The first positioning seat 51 has a pivot portion 511 pivoted to the lower seat 2 through a pivot shaft 24 that is journalled to the lower seat 2, an abutment portion 512 distal from the pivot portion 511 and located in the clamping opening 30, a pushed portion 513 disposed below the pivot portion 511, an arc-shaped guide groove 514 arcing relative to the pivot portion 511 and located between the pivot portion 511 and the abutment portion 512, and a guide pin 23 extending through the guide groove 514 and fixed to the lower seat 2. The drive member 52 is threadedly connected to the lower seat 2, and has a pushing portion 522 abutting against the pushed portion 513, and an operating portion 521 disposed on one end of the drive member 52 opposite to the pushing portion 521. The roller 53 is rotatably connected to the abutment portion 512.

Figure 5:
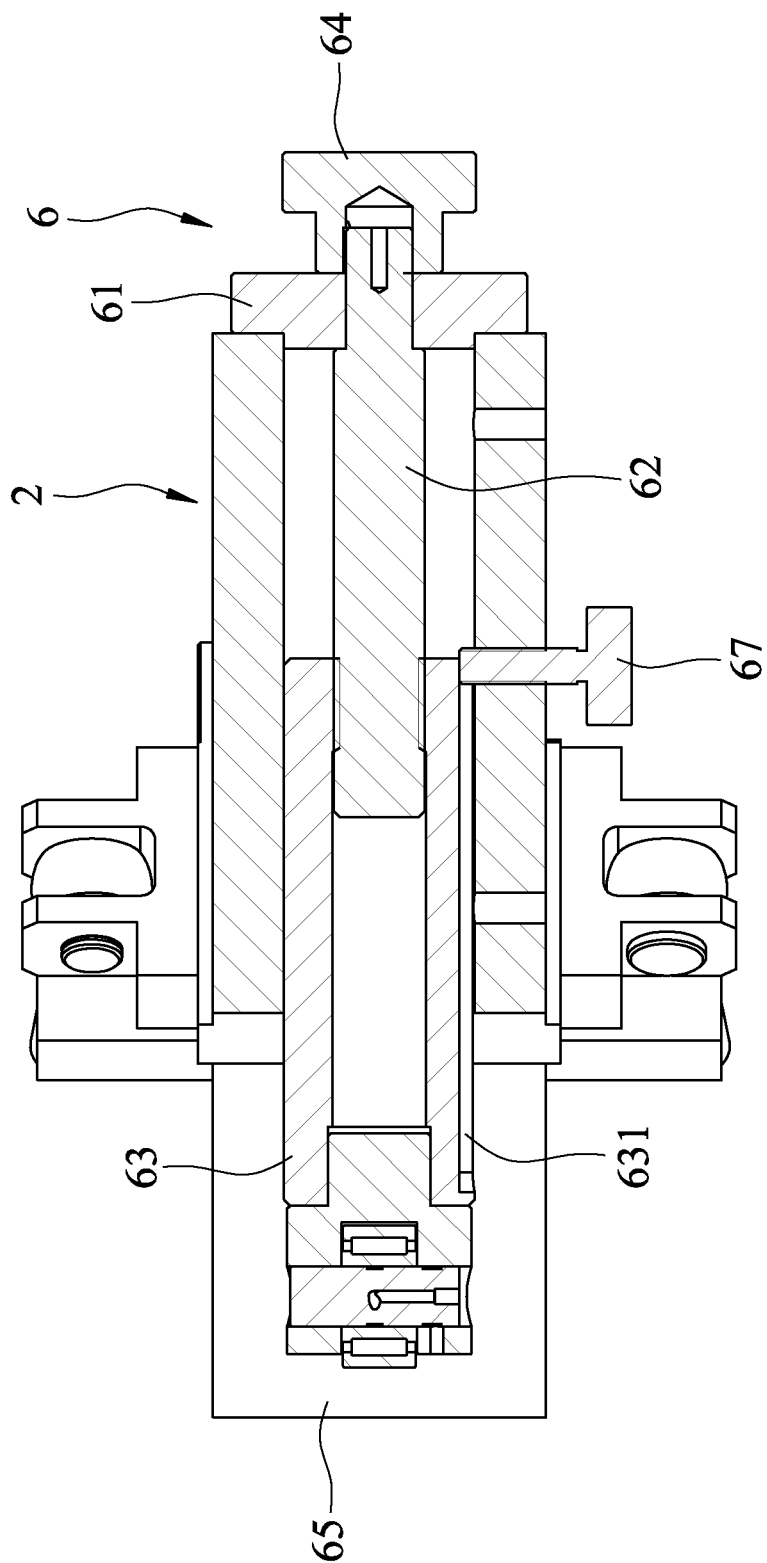
FIG. 5 is a sectional view of the preferred embodiment taken along line V-V of FIG. 2.

With reference to FIGS. 2 and 5, the second abutment support unit 6 includes a second positioning seat 61 fixed to the lower seat 2 in proximity to the top end 21 thereof, a first rotary rod 62 rotatably positioned on the second positioning seat 61 and extending into the lower seat 2, a first slide rod 63 connected to and driven by the rotary rod 62 to slide in the lower seat 2, an operating portion 64 connected to one end of the first rotary rod 62, an abutment portion 65 disposed on the first slide rod 63 opposite to the first rotary rod 62 and located in the clamping opening 30, a roller 66 rotatably connected to the abutment portion 65, and a turn stopper 67. In this embodiment, the end of the first rotary rod 62 distal from the operating portion 64 is screwed to one end of the first slide rod 63 distal from the abutment portion 65. The first slide rod 63 has a guide groove 631 formed on an outer peripheral surface thereof and extending along the length of the first slide rod 63. The turn stopper 67 is disposed on the lower seat 2, and has one end extending into the guide groove 631. Through this, rotation of the first slide rod 63 is restricted by the turn stopper 67 during rotation of the first rotary rod 62, so that the first slide rod 63 can only move linearly in the lower seat 2.

Figure 6:
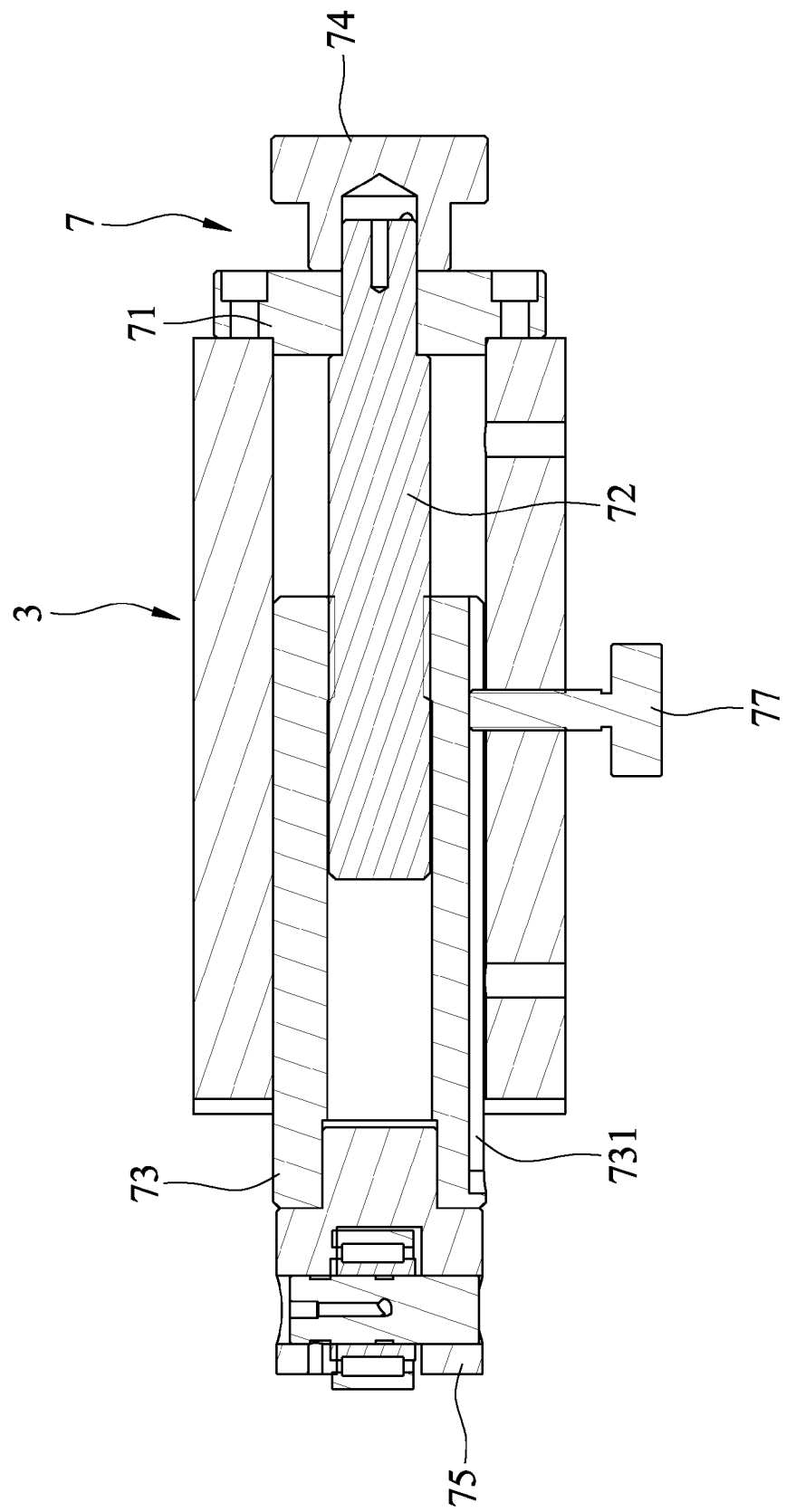
FIG. 6 is a sectional view of the preferred embodiment taken along line VI-VI of FIG. 2.

With reference to FIGS. 2 and 6, the third abutment support unit 7 includes a third positioning seat 71 fixed to one end of the upper seat 3 distal from the top end 21 of the lower seat 2, a second rotary rod 72 rotatably positioned on the third positioning seat 71 and extending into the upper seat 3, a second slide rod 73 connected to and driven by the second rotary rod 72 to slide in the upper seat 3, an operating portion 74 connected to one end of the second rotary rod 72, an abutment portion 75 disposed on the second slide rod 73 opposite to the second rotary rod 72 and located in the clamping opening 30, a roller 76 rotatably connected to the abutment portion 75, and a turn stopper 77. In this embodiment, the end of the second rotary rod 72 distal from the operating portion 74 is screwed to one end of the second slide rod 73 distal from the abutment portion 75. The second slide rod 73 has a guide groove 731 formed on an outer peripheral surface thereof and extending along the length of the second slide rod 73. The turn stopper 77 is disposed on the upper seat 3, and has one end extending into the guide groove 731. Through this, rotation of the second slide rod 73 is restricted by the turn stopper 77 during rotation of the second rotary rod 72, so that the second slide rod 73 can only move linearly in the upper seat 3.

In this embodiment, the abutment portions 512, 65, 75 of the first, second and third abutment support units 5, 6, 7 are spaced apart from each other at an angle of about 120°. Each of the rollers 53, 66, 76 of the first, second and third abutment support units 5, 6, 7 has a rolling surface for abutting against an outer peripheral surface of the workpiece 80. Through this, the workpiece 80 can rotate about the longitudinal axis (L), and a processing operation of the entire workpiece 80 can be performed.

Further, because the drive member 52 is threadedly connected to the lower seat 2, when the operating portion 521 of the drive member 52 is rotated, the pushing portion 522 is driven to move toward the pushed portion 513 so as to push the same. This leads to pivot movement of the first positioning seat 51 about the pivot portion 511 toward the workpiece 80, so that the abutment portion 512 abuts and supports the workpiece 80. When the operating portion 521 is rotated again to move the pushing portion 522 away from the pushed portion 513, the first positioning seat 51 moves down and away from the workpiece 80 by gravity. Through coordination of the guide pin 23 and the guide groove 514, an angular range of rotation of the first positioning seat 51 can be restricted.

Moreover, when the operating portion 64, 74 of each of the second and third abutment support units 6, 7 is operated, the first or second slide rod 63, 73 is driven by the respective first or second rotary rod 62, 72 to slide out of or into the respective lower or upper seat 2, 3, so that the abutment portion 65, 75 of each of the second and third abutment support units 6, 7 can move to abut and support the workpiece 80 or move away from the workpiece 80.

To clamp the workpiece 80 on the center frame 100, the free end of the limiting rod 41 is first moved out of the limiting groove 420 of the limiting grooved element 42, so that the upper seat 3 is freely rotatable relative to the lower seat 2. Next, the upper seat 3 is rotated away from the lower seat 2 to the releasing position (see FIG. 3), after which the workpiece 80 is placed in the clamping opening 30 between the first and second abutment support units 5, 6 and is abuttingly supported by the rollers 53, 66 of the first and second abutment support units 5, 6. Thereafter, the upper seat 3 is rotated toward the lower seat 2 to the clamping position (see FIG. 2) and the free end of the limiting rod 41 is rotated to engage with the limiting groove 420, thereby limiting movement of the upper seat 3 relative to the lower seat 2. Finally, minute adjustments are made on the first, second and third abutment support units 5, 6, 7 so as to stably clamp the workpiece 80 on the center frame 100. At this time, the rolling surfaces of the rollers 53, 66, 76 of the first, second and third abutment support units 5, 6, 7 abut against the outer peripheral surface of the workpiece 80. Through this, the workpiece 80 can rotate about the longitudinal axis (L), and a processing operation of the entire workpiece 80 can be performed.

To remove the workpiece 80 from the center frame 100, the free end of the limiting rod 41 is moved out of the limiting groove 420 so that the upper seat 3 can freely rotate relative to the lower seat 2, after which the upper seat 3 is rotated away from the lower seat 2 to the releasing position shown in FIG. 3. The workpiece 80 can be removed from the center frame 100 at this time.

In summary, because the upper seat 3 is rotatable relative to the lower seat 2 about an axis that is parallel to the longitudinal axis (L) between the clamping and releasing positions, the center frame 100 of the CNC machine tool of this invention can facilitate quick and smooth clamping and releasing of the workpiece 80 to and from the center frame 100.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A center frame of a CNC machine tool for supporting a workpiece, the workpiece defining a longitudinal axis, said center frame comprising:
   a lower seat;
   an upper seat pivoted to a top end of said lower seat and pivotable about an axis which is parallel to the longitudinal axis, said upper seat being pivotable relative to said lower seat between a clamping position, where said upper seat cooperates with said lower seat to define a clamping opening for receiving and clamping the workpiece, and a releasing position, where said upper seat is rotated away from said lower seat; and a clamping unit including a first abutment support unit disposed on a bottom portion of said lower seat, a second abutment support unit disposed on said lower seat in proximity to said top end thereof, and a third abutment support unit disposed on one end of said upper seat distal from said top end of said lower seat, each of said first, second and third abutment support units having an abutment portion located in said clamping opening, and an operating portion opposite to said abutment portion, said operating portion of each of said first, second and third abutment support units being operated to move said abutment portion to abut against or away from the workpiece, so that the workpiece is clamped among said first, second and third abutment support units when said abutment portions of said first, second and third abutment support units abut against the workpiece;

wherein said first abutment support unit includes a first positioning seat and a drive member, said first positioning seat having a pivot portion pivoted to said lower seat, and a pushed portion disposed below said pivot portion, said abutment portion of said first abutment support unit being provided on said first positioning seat distal from said pivot portion, said drive member having a pushing portion abutting against said pushed portion, said operating portion of said first abutment support unit being provided on one end of said drive member opposite to said pushing portion, said pushing portion pushing said pushed portion to pivot upward said first positioning seat about said pivot portion so as to move said abutment portion of said first abutment support unit abuttingly against the workpiece when said operating portion of said first abutment support unit is operated.

2. The center frame as claimed in claim 1, wherein:

said second abutment support unit includes a second positioning seat disposed on said lower seat, a first rotary rod rotatably positioned on said second positioning seat and extending into said lower seat, and a first slide rod connected to and driven by said first rotary rod to slide in said lower seat, said operating portion of said second abutment support unit being provided on one end of said first rotary rod opposite to said first slide rod, said abutment portion of said second abutment support unit being provided on one end of said first slide rod opposite to said first rotary rod; and said third abutment support unit includes a third positioning seat disposed on said upper seat, a second rotary rod rotatably positioned on said third positioning seat and extending into said upper seat, and a second slide rod connected to and driven by said second rotary rod to slide in said upper seat, said operating portion of said third abutment support unit being provided on one end of said second rotary rod opposite to said second slide rod, said abutment portion of said third abutment support unit being provided on one end of said second slide rod opposite to said second rotary rod.

3. The center frame as claimed in claim 1, wherein each of said first, second and third abutment support units further has a roller rotatably connected to said abutment portion.

4. The center frame as claimed in claim 1, wherein said abutment portions of said first, second and third abutment support units are spaced apart from each other at an angle of about 120°.

5. A center frame of a CNC machine tool for supporting a workpiece, the workpiece defining a longitudinal axis, said center frame comprising:

a lower seat;

an upper seat pivoted to a top end of said lower seat and pivotable about an axis which is parallel to the longitudinal axis, said upper seat being pivotable relative to said lower seat between a clamping position, where said upper seat cooperates with said lower seat to define a clamping opening for receiving and clamping the workpiece, and a releasing position, where said upper seat is rotated away from said lower seat; and a clamping unit including a first abutment support unit disposed on a bottom portion of said lower seat, a second abutment support unit disposed on said lower seat in proximity to said top end thereof, and a third abutment support unit disposed on one end of said upper seat distal from said top end of said lower seat, each of said first, second and third abutment support units having an abutment portion located in said clamping opening, and an operating portion opposite to said abutment portion, said operating portion of each of said first, second and third abutment support units being operated to move said abutment portion to abut against or away from the workpiece, so that the workpiece is clamped among said first, second and third abutment support units when said abutment portions of said first, second and third abutment support units abut against the workpiece;

wherein said first abutment support unit includes a first positioning seat and a drive member, said first positioning seat having a pivot portion pivoted to said lower seat, and a pushed portion disposed below said pivot portion, said abutment portion of said first abutment support unit being provided on said first positioning seat distal from said pivot portion, said drive member having a pushing portion abutting against said pushed portion, said operating portion of said first abutment support unit being provided on one end of said drive member opposite to said pushing portion, said pushing portion pushing said pushed portion to pivot upward said first positioning seat about said pivot portion so as to move said abutment portion of said first abutment support unit abuttingly against the workpiece when said operating portion of said first abutment support unit is operated; and wherein said drive member is threadedly connected to said lower seat, said first positioning seat further having an arc-shaped guide groove arcing relative to said pivot portion, and a guide pin extending through said guide groove and fixed to said lower seat, said pivot portion being pivoted to said lower seat through a pivot shaft that is journalled to said lower seat.

6. A center frame of a CNC machine tool for supporting a workpiece, the workpiece defining a longitudinal axis, said center frame comprising:

a lower seat;

an upper seat pivoted to a top end of said lower seat and pivotable about an axis which is parallel to the longitudinal axis, said upper seat being pivotable relative to said lower seat between a clamping position, where said upper seat cooperates with said lower seat to define a clamping opening for receiving and clamping the workpiece, and a releasing position, where said upper seat is rotated away from said lower seat; and a clamping unit including a first abutment support unit disposed on a bottom portion of said lower seat, a second abutment support unit disposed on said lower seat in proximity to said top end thereof, and a third abutment support unit disposed on one end of said upper seat distal from said top end of said lower seat, each of said first, second and third abutment support units having an abutment portion located in said clamping opening, and an operating portion opposite to said abutment portion, said operating portion of each of said first, second and third abutment support units being operated to move said abutment portion to abut against or away from the workpiece, so that the workpiece is clamped among said first, second and third abutment support units when said abutment portions of said first, second and third abutment support units abut against the workpiece;

wherein said first abutment support unit includes a first positioning seat and a drive member, said first positioning seat having a pivot portion pivoted to said lower seat, and a pushed portion disposed below said pivot portion, said abutment portion of said first abutment support unit being provided on said first positioning seat distal from said pivot portion, said drive member having a pushing portion abutting against said pushed portion, said operating portion of said first abutment support unit being provided on one end of said drive member opposite to said pushing portion, said pushing portion pushing said pushed portion to pivot upward said first positioning seat about said pivot portion so as to move said abutment portion of said first abutment support unit abuttingly against the workpiece when said operating portion of said first abutment support unit is operated; and wherein said center frame further comprises a limiting unit configured to limit said upper seat at said clamping position.

7. The center frame as claimed in claim 6, wherein said limiting unit includes a limiting rod, and a limiting grooved element fixed to said upper seat at a location proximate to a junction of said upper seat and said lower seat and having a limiting groove, said limiting rod having one end pivoted to said lower seat at a location proximate to the junction of said upper seat and said lower seat, and the other end free, said free end of said limiting rod being rotated to engage with said limiting groove when said upper seat is in said clamping position.

\* \* \* \* \*